United States Patent
Schmitz et al.

(10) Patent No.: US 8,764,123 B2
(45) Date of Patent: Jul. 1, 2014

(54) AXLE ASSEMBLY FOR A COMMERCIAL VEHICLE AND METHOD FOR PRODUCING AN AXLE ASSEMBLY OF THIS TYPE

(75) Inventors: Peter Schmitz, Altenberge (DE); Jorg Ebert, Cologne (DE)

(73) Assignee: Schmitz Cargobull AG, Altenberge (DE)

( * ) Notice: Subject to any disclaimer, the term of this patent is extended or adjusted under 35 U.S.C. 154(b) by 722 days.

(21) Appl. No.: 12/739,490

(22) PCT Filed: Oct. 27, 2008

(86) PCT No.: PCT/EP2008/064536
§ 371 (c)(1),
(2), (4) Date: Sep. 15, 2010

(87) PCT Pub. No.: WO2009/053491
PCT Pub. Date: Apr. 30, 2009

(65) Prior Publication Data
US 2011/0001350 A1 Jan. 6, 2011

(30) Foreign Application Priority Data

Oct. 27, 2007 (DE) .................. 10 2007 051 501

(51) Int. Cl.
*B60B 35/02* (2006.01)
*B60G 3/12* (2006.01)
(52) U.S. Cl.
USPC ................. 301/124.1; 301/127; 280/124.128; 280/124.116
(58) Field of Classification Search
CPC .. B60B 35/004; B60B 35/006; B60B 35/007; B60B 35/008; B60B 35/02; B60B 35/06; B60B 35/08; B60G 9/003; B60G 3/12; B60G 3/14
USPC ......... 301/124.1, 127; 280/124.116, 124.128, 280/124.166, 124.175
See application file for complete search history.

(56) References Cited

U.S. PATENT DOCUMENTS 5,800,024 A 9/1998 Steimmel et al.
5,954,351 A 9/1999 Koschinat
(Continued)

FOREIGN PATENT DOCUMENTS

DE 4203372 C1 3/1993
DE 19603764 A1 8/1997
(Continued)

*Primary Examiner* — Kip T Kotter
(74) *Attorney, Agent, or Firm* — The Webb Law Firm

(57) ABSTRACT

The invention relates to an axle assembly for a commercial vehicle, having an axle produced from a first metal material and at least one trailing link produced from a second metal material which has a connecting portion with a seat which the axle sits with a hollow coupling portion such that the axle and the trailing link are in torque-proof engagement with one another. In an axle assembly of this type, an optimally reliable connection between the individual components of "trailing link" and "axle" is ensured in a cost-effective and simple manner in that the characteristics of the metal materials from which the connecting portion of the trailing link and the coupling portion of the axle are made, are coordinated with one another such that the modulus of elasticity of the connecting portion is less than the modulus of elasticity of the coupling portion and/or the breaking strength of the connecting portion is greater than the breaking strength of the coupling portion encompassed by the connecting portion in the joined state, and/or the yield strength $R_{eS}$, or if the metal material does not have a clearly defined yield strength $R_{eS}$, the proof stress $R_{p0.2}$ of the metal material, of which the connecting portion of the trailing link is made, is higher than the yield strength $R_{eS}$ or proof stress $R_{p0.2}$ of the metal material of the coupling portion, encompassed by the connecting portion, of the axle.

8 Claims, 6 Drawing Sheets

(56) References Cited

U.S. PATENT DOCUMENTS

| | | | |
|---|---|---|---|
| 6,086,162 A * | 7/2000 | Pinch et al. | 301/124.1 |
| 7,360,774 B2 * | 4/2008 | Saieg et al. | 280/124.128 |
| 7,536,765 B2 * | 5/2009 | Deslande et al. | 29/419.2 |
| 7,887,073 B2 | 2/2011 | Drewes | |
| 7,900,942 B2 | 3/2011 | Koschinat | |
| 7,984,552 B2 * | 7/2011 | Doud et al. | 29/897.2 |
| 2005/0156462 A1 * | 7/2005 | Abrat et al. | 301/124.1 |
| 2006/0237939 A1 * | 10/2006 | Hicks | 280/124.116 |
| 2008/0314509 A1 | 12/2008 | Criqui et al. | |

FOREIGN PATENT DOCUMENTS

| | | |
|---|---|---|
| DE | 19929057 A1 | 12/2000 |
| DE | 102005007143 A1 | 5/2006 |
| DE | 102005038274 A1 | 2/2007 |
| DE | 102006009441 A1 | 9/2007 |
| EP | 0713791 A1 | 5/1996 |
| EP | 0830959 A2 | 3/1998 |
| EP | 1036680 A2 | 9/2000 |
| FR | 2888559 A1 | 1/2007 |

* cited by examiner

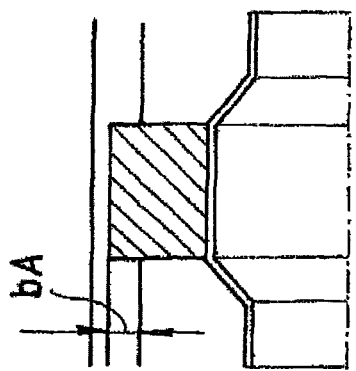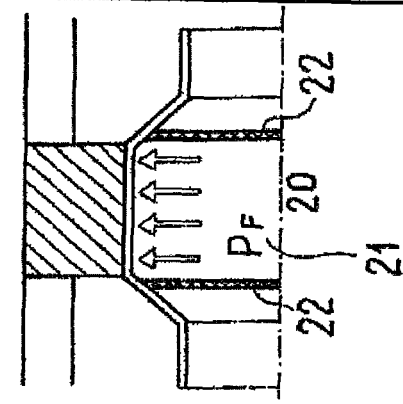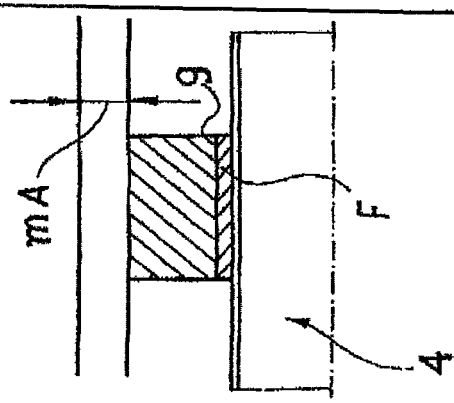

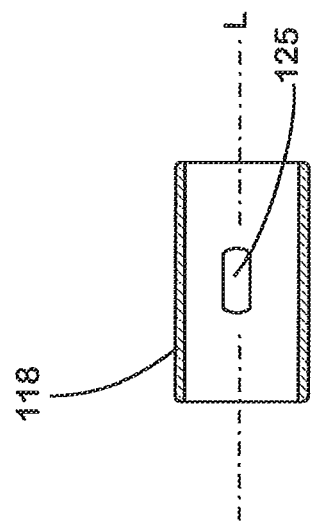
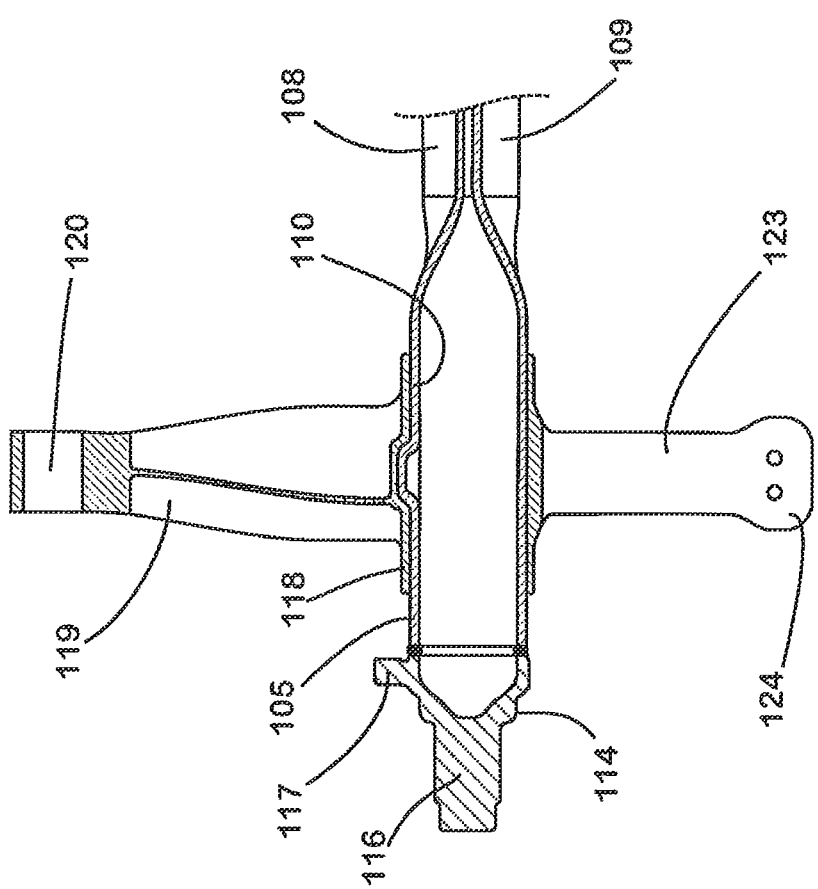

AXLE ASSEMBLY FOR A COMMERCIAL VEHICLE AND METHOD FOR PRODUCING AN AXLE ASSEMBLY OF THIS TYPE

BACKGROUND OF THE INVENTION

1. Field of the Invention

The invention relates to an axle assembly for a non-powered axle of a commercial vehicle, comprising an axle produced from a first metal material and at least one trailing link which is produced from a second metal material and has a connecting portion with a seat in which the axle sits with a hollow coupling portion such that the axle and the trailing link are torque-proof engaged with one another. Axle assemblies of this type are used, for example, on trailers or semi-trailers for lorries and articulated lorries.

2. Description of the Related Art

There are many known axle constructions of this type which are also termed "rigid axles". They usually comprise a trailing link which is coupled pivotally by one end to the vehicle frame via a suitable joint and is supported on the other side on the vehicle via a spring/damper combination. This allows a simple resilient mounting of an axle which meets the requirements made hitherto for trailers or semi-trailers of lorries, for example. The travelling behaviour of axle assemblies of the type in question can be improved by designing the axle such that at least portions of it are torsionally flexible, so that the movements of the trailing links bearing the axle are uncoupled from one another to a greater extent.

As summarised in EP 0 830 959 B1 or in DE 10 2006 009 441 A1, the connection between the trailing links and the axle supported thereby is produced in the prior art by clamping, screwing or welding, for example. In this respect, the trailing links are usually made of cast steel, whereas the axles are produced as profiles from a steel material.

A disadvantage of the known axle constructions described above is that they usually require a high material and production expense so that particularly the mounting thereof in the trailing links can absorb the high stresses which occur in practice with sufficient reliability.

Another axle assembly of the type stated above is known from EP 0 713 791 B1. In a first variant of the axle assembly described in this document, a trailing link is used which is configured as a hollow aluminium profile and is closed at its ends. Configured on one end thereof by a forming process also termed "hydroforming" is a head part which is subsequently provided with a passage opening oriented transversely to the longitudinal extent of the trailing link.

In "hydroforming" of the type described in EP 0 713 791 B1, the hollow component to be formed is introduced into a die presenting the desired shape of the component and then subjected from inside to a high-pressure incompressible fluid. Thereupon, the material of the trailing link starts to flow until it lies against the inner surfaces of the die. Thus, it is possible to configure with high precision on prefabricated profiles specific moulded elements which are required for the further operation of the component to be respectively produced.

In order to produce the passage opening in the head part produced by hydroforming, of the trailing link, in the prior art described in EP 0 713 791 B1 the wall material, present in the region intended for said passage opening, of the trailing link is removed by a machining process. The shape of the opening cross-section differs from that of a circle. Subsequently, inserted through the opening in the trailing link is an axle, the external dimensions of which are adapted to the shape of the opening of the trailing link such that after being inserted, the axle sits positively and non-rotatably in the opening in the trailing link.

Since the head part is then compressed by an externally acting pinching tool, according to EP 0 713 791 B1, the positive locking can be optimised between the axle and the trailing link. This same purpose is served when it is proposed in EP 0 713 791 B1 to widen the axle seated in the trailing link by hydroforming.

It is likewise possible according to EP 0 713 791 B1 to secure the torque-proof engagement between the trailing link and the axle by also connecting them together in a material-uniting manner by bonding or welding or additionally in a non-positive and positive manner by mechanical processes, such as clinching.

Finally, according to EP 0 713 791 B1, hydroforming can respectively form the end portions of the axle which respectively freely project beyond the trailing link such that they can be used for connecting a wheel support plate or as a seat for a rubber joint of a spring system.

The variants of the prior art described in EP 0 713 791 B1, in which hydroforming is used, each proceed from axles and trailing links which are produced as extruded profiles of an aluminium material of the composition also stated in EP 0 713 791 B1. An additional variant of the prior art described in EP 0 713 791 B1 provides the prefabrication of the trailing link as a cast part, on which a seat for the axle is already configured, which seat differs from a circular shape. The correspondingly formed axle is then introduced into the seat of the trailing link. The cross-sectional shape of axle and trailing link seat which differs from a circle ensures that the axle is mounted in the seat with no risk of twisting. The actual connection between trailing link and axle according to EP 0 713 791 B1 is then made by bonding, welding or shrinking.

The advantage of the various configuration variants of an axle assembly known from EP 0 713 791 B1 is that they allow, in a relatively simple manner, the axle to be formed and attached such that on the one hand it has a torsionally flexible centre portion which can be used in the manner of a torsion spring, while on the other hand it is held securely in the trailing links by its coupling portions respectively associated with the trailing links.

These advantages are countered by the disadvantage that in spite of the use of modern production methods, such as hydroforming, the production of the known assembly is expensive. Furthermore, an axle assembly produced according to EP 0 713 791 B1 is incapable of absorbing with sufficient reliability the high stresses which occur in the practical use of a commercial vehicle.

SUMMARY OF THE INVENTION

The object of the invention is to provide an axle assembly and a method for the production thereof, which axle assembly can be produced in a cost-effective manner and with which an optimally reliable connection is ensured in a simple manner between the individual components of "trailing link" and "axle".

An axle assembly according to the invention comprises an axle produced from a first metal material, in particular a steel material, and at least one trailing link produced from a second metal material, in particular cast iron.

The trailing link of an axle assembly according to the invention has a connecting portion into which a seat is moulded. The axle sits in this seat with a hollow coupling portion.

The seat moulded into the connecting portion of the trailing link is configured such that the connecting portion engages around the coupling portion of the axle at least to such an extent that the axle is held securely in the seat. A particularly secure retention can be ensured in that the seat is configured as an opening in which the axle sits and which completely surrounds the coupling portion.

Furthermore, in an axle assembly according to the invention, the axle and the trailing link are in torque-proof engagement with one another at least by a frictional connection. According to the invention, for this purpose the materials from which the connecting portion of the trailing link and the coupling portion of the axle are produced are coordinated with one another such that at least one of the following conditions is met:

a) The modulus of elasticity E of the metal material from which the connecting portion of the trailing link is made, is lower than the modulus of elasticity E of the metal material of the coupling portion, encompassed thereby, of the axle.

b) The breaking strength Rm of the metal material of the trailing link connecting portion is greater than the breaking strength Rm of the metal material of the coupling portion of the axle.

c) The yield strength $R_{eS}$ or alternatively, if the respective metal material of the connecting portion does not have a clearly defined yield strength, the proof stress $R_{p0.2}$ of the metal material, from which the connecting portion of the trailing link is moulded, is higher than the yield strength $R_{eS}$ or proof stress $R_{p0.2}$ of the metal material from which the coupling portion, encompassed thereby, of the axle is produced.

Each of the aforementioned conditions a)-c) can be met alternatively or additionally, i.e. on their own or combined with respectively at least one other of these conditions a)-c). The term "yield strength" $R_{eS}$ as used herein is understood, as usual, as meaning the stress at which the respective metal material starts to flow without the prevailing stress being further increased. The proof stress $R_{p0.2}$ is the (uniaxial) mechanical stress at which the remaining extension based on the starting length of the sample amounts to 0.2% after unloading.

It is only the difference, predetermined according to the invention and existing at least in the region of its connection, of the elastic deformability of trailing link and axle support which allows the axle and trailing link of an axle assembly to be so rigidly interconnected merely by a frictional connection that the connection can absorb the stresses, occurring in practice, with the necessary reliability. Due to the fact that the yield strength or proof stress of the connecting portion, located outside, of the trailing link is greater than the yield strength or proof stress of the coupling portion, located inside, of the axle and/or the modulus of elasticity of the metal material, of which at least the connecting portion of the trailing link is made, is less than the modulus of elasticity of the metal material, of which the tubular portion, encompassed by the trailing link connecting portion, of the axle is made, and/or the breaking strength Rm of the material of the trailing link connecting portion is greater than the breaking strength Rm of the coupling portion, encompassed thereby, of the axle, the connecting portion can still be in the range of its elastic deformability after a widening in the unloaded state, so that the connecting portion exerts a resilient restoring force on the coupling portion, encompassed thereby, of the axle.

Making full use of this correlation, in an axle assembly according to the invention, the trailing link is under an elastic stress at least in the region of its connecting portion following a forming operation, while the axle is deformed in a permanently plastic manner to a greater extent by a widening at least in the region of its coupling portion encompassed by the trailing link.

Accordingly, in an axle assembly according to the invention, the connection between the trailing link and the axle is primarily produced in that the axle is deformed permanently up into the plastic range at least in the region of its coupling portion, while the connecting portion of the trailing link which surrounds the coupling portion is, at best, partially plastically deformed, thus in the connecting portion a resilient restoring force is still present by which a pressing action is produced between the outer surface of the coupling portion of the axle and the inner surface of the seat of the trailing link. Consequently, a frictional connection is thus created between the inner periphery of the connecting portion of the trailing link and the fitting coupling portion of the axle so that the torsional moment introduced by the axle during practical use is reliably transmitted to the trailing link via the frictional connection produced according to the invention.

An axle assembly according to the invention can be produced in a particularly simple manner. For this purpose, firstly an axle having at least one hollow, externally accessible coupling portion and a trailing link are provided, said trailing link having a seat for the coupling portion of the axle, the clearance of the seat in relation to the external dimensions of the coupling portion of the axle being calculated such that the coupling portion of the axle can be introduced with clearance into the seat. At the same time, the characteristics of the metal materials, from which the connecting portion of the trailing link and the coupling portion of the axle are made, are coordinated with one another in the manner according to the invention which has already been described such that the modulus of elasticity of the connecting portion is less than the modulus of elasticity of the coupling portion and/or the breaking strength of the connecting portion is greater than the breaking strength of the coupling portion encompassed by the connecting portion in the joined state, and/or the yield strength $R_{eS}$, or if the metal material does not have a clearly defined yield strength $R_{eS}$, the proof stress $R_{p0.2}$ of the metal material, from which the connecting portion of the trailing link is made, is higher than the yield strength $R_{eS}$ or proof stress $R_{p0.2}$ of the metal material of the coupling portion, encompassed by the connecting portion, of the axle.

The axle provided thus is then joined together with the trailing link such that the coupling portion of the axle sits in the seat of the trailing link.

The coupling portion of the axle is then widened until the joining gap between the inner surface of the seat of the trailing link and the outer surface of the coupling portion of the axle is closed. By the size of the joining gap or the clearance present after the trailing link and axle have been joined, it is possible to predetermine the amount by which the coupling portion is deformed before the trailing link is also widened. This ensures that the deformation of the coupling portion respectively progresses in the course of the widening such that the plastic range is reliably attained.

The widening of the coupling portion of the axle is then continued until the connecting portion of the trailing link is deformed elastically after unloading and the coupling portion of the axle is deformed in a permanently plastic manner such that the connecting portion is under an elastic stress which causes a frictional connection between the trailing link and the axle.

A maximum restoring force in the connecting portion of the trailing link is produced when the connecting portion is expanded to such an extent in the course of the widening that the stresses prevailing in the connecting portion are in the region of its respective yield strength or proof stress. A deformation, in the partially plastic range, of the connecting portion is acceptable as long as it is ensured that an adequate differential springback remains for a frictional connection between trailing link and axle. It is essential in each case that the springback of the coupling portion of the axle is respectively less than the springback of the connecting portion, surrounding the coupling portion, of the trailing link.

The reliability of the connection according to the invention of trailing link and axle can be further increased in that in addition to being non-positively connected, the trailing link and the axle are also positively connected to one another, in that a shaped element of the axle cooperates positively with a correspondingly formed shaped element of the trailing link. In such axle assemblies according to the invention in which the trailing link consists of an, at best, restrictedly cold-formable material, for example cast iron, and at least the coupling portion of the axle consists of a more easily workable material, for example a steel, this can be accomplished in that, for example the shaped element of the axle is a projection which is directed outwards in the radial direction and the correspondingly formed shaped element of the trailing link is a recess into which the projection of the axle engages in a positive manner.

A positive connection configured in this manner can be produced in practice in that a recess is moulded into the inner surface of the seat of the trailing link during the prefabrication of the trailing link. After the trailing link and the axle have been joined together, a projection is formed on the coupling portion of the axle which engages in this recess.

The projection can be produced in a practice-oriented manner by a cold forming operation which is carried out after the joining procedure. For this purpose, a punch-like tool in the hollow coupling portion can be used which is introduced into the coupling portion and which acts in the radial direction against the outer wall of the coupling portion of the axle from the interior defined by the coupling portion. In this respect, the recess in the connecting portion of the trailing link serves as a die such that it is automatically ensured that the projection engages in the recess positively and substantially without clearance after the completion of the deformation process.

The projection is conveniently produced before the coupling portion of the axle is widened. During the subsequent widening, the fit of the projection in the seat of the trailing link is additionally optimised. However, depending on the available systems engineering, it can also be expedient in respect of minimising the processing times to produce the projection and to widen the coupling portion in one go.

Alternatively, it is conceivable to perform the widening of the coupling portion of the axle such that the material of the axle nestles into the recess in the trailing link during the widening step and thus ensures the positive securing connection against twisting.

The strains which occur in practice can be particularly effectively absorbed by the projection, for example when the recess in the trailing link is configured in the manner of a groove which is advantageously oriented axially parallel to the longitudinal axis of the seat and in which the projection of the axle engages in the manner of a sliding block.

A particularly economical configuration of the axle assembly according to the invention is characterised in that the axle is configured as an integral hollow profile, in particular as an axle tube. A torsional portion which is torsionally more flexible than the coupling portion of the axle can be produced in a hollow profile of this type, for example also by cold-forming or by a mechanical machining processing. If, in an axle assembly according to the invention, the axle is supported by two trailing links respectively associated with one of its end portions, the torsional portion can be arranged between the end portion's of the axle, as in the prior art. Due to the torsionally flexible design of the axle used in an axle assembly according to the invention, it is possible to use components for absorbing and damping the movements, occurring in practical use, of the trailing link relative to the chassis, the overall size of which is significantly reduced compared to the components of this type required in conventional axle constructions.

In an axle assembly according to the invention, it is unnecessary for additional components such as brackets, screw connections or the like to be arranged in the region of the connection between the trailing link and the axle. This fact alone entails a considerable reduction in the available space required for an axle assembly according to the invention. Furthermore, in the axle assembly according to the invention, it is unnecessary for any welding work to be carried out on the axle or the trailing link which could weaken the trailing link or the axle. Instead, due to the fact that the forces required for the connection of axle and trailing link are transmitted via the relatively large contact surfaces between these two components, favourable pressing ratios are achieved. All this makes it possible to minimise the wall thicknesses in the region of the connecting portion of the trailing link and the overall wall thickness of the axle tube. Consequently, an axle assembly according to the invention thus occupies only a very small amount of space, particularly in the pivoting direction of the trailing link. This makes it possible, for example, to reduce the free space under the respective vehicle in favour of the useable loading space of the respective transport vehicle.

Practical tests have shown that in the event that at least the coupling portion of the axle is produced from a conventional steel material, for example a conventional structural steel, such as a type of steel standardised in EN-10025, while the trailing link consists of cast iron, in particular ductile iron (cast iron with nodular graphite, "GJS"), a satisfactory loadability of the axle and of the trailing link is even ensured with a wall thickness of the axle tube of less than 12 mm, in particular 8 mm.

An axle assembly according to the invention can be produced in a particularly cost-effective manner when, as already mentioned, the trailing link is produced from a cast metal material. This applies particularly if the trailing link is configured integrally. In this respect, a cast iron material is particularly suitable for the cost-effective production in terms of casting, particularly good characteristic combinations being achieved with the use of ductile iron.

To support the frictional connection between the connecting portion of the trailing link and the coupling portion of the axle, friction-increasing structures can be provided on at least one of the mutually associated surfaces of trailing link and axle. These structures can be configured such that in addition to the frictional connection, they also produce a positive locking between trailing link and axle.

Configured on the trailing link provided in an axle assembly according to the invention can be at least one bracket for coupling a functional element, such as an air spring bellows, a shock absorber, a component of a braking system or a component of an axle lift installation.

A further embodiment of the invention resulting in a surprising increase in the strength of the connection between the axle and the trailing link is characterised in that the at least non-positive connection between the trailing link and the portion of the axle, encompassed thereby, is determined while in a new condition such that when the axle assembly is used, there is a relative movement within the micrometer range between the axle and the trailing link, as a result of which abraded particles form which are trapped in the joining gap and further impede the relative movement. In this embodiment of the invention, the non-positive connection between the trailing link and the axle is purposefully designed such that starting from the new condition of the connection, so-called "fretting corrosion" results due to micro movements. Metallic abraded particles and oxides are formed in the joining gap due to this form of corrosion. These particles continue to accumulate in the joining gap as service life increases, with the result that the connection between the trailing link and the axle becomes ever stronger.

Internal high pressure forming is particularly suitable for widening the coupling portion of the axle. The widening of cylindrical bodies using an internal pressure applied above fluids is known per se. For example, functional elements can be attached to hollow shafts by internal high pressure forming (cf. DE 10 2005 007 143 A1).

If the trailing link is produced by casting, in particular from cast iron as one piece, and the axle assembly according to the invention also has, in addition to the trailing link, an air spring which comprises a roll bellows with a rolling fold and a rolling piston which is supported by the roll bellows and which, when the rolling fold is unrolled, can be moved into and out of the roll bellows in one stroke movement over a restricted stroke path, the rolling piston supporting on its free end face directed out of the roll bellows an insertion body via which it is supported on a support arm of the trailing link in normal travelling operation, a further embodiment of the invention which is particularly advantageous in practice is that the trailing link has a control arm which has a bearing for pivotally mounting the trailing link on the frame of the vehicle, a seat for an axle of the vehicle and a support arm in which a recess is moulded which is formed corresponding to the insertion body of the rolling piston and in which the insertion body of the rolling piston sits in a normal travelling position of the trailing link such that the recess fixes the insertion body in a direction oriented transversely to the direction of its stroke movement, while it is freely movable in the direction of the roll bellows. Thus, in this embodiment of an axle assembly according to the invention, not only are the moulded elements integrated which are required in this case for the operation of the trailing link itself, such as control arm, support arm and axle seat, but according to the invention a seat is also integrated, by which a positive connection exists between the rolling piston of the pneumatic suspension and the trailing link during normal travelling operation. This connection is configured such that the rolling piston is automatically separated from the trailing link when the trailing link is pivoted outwards upon complete unloading of the respective vehicle axle via a maximum lowering position of the rolling piston. In this way, the advantages of the principle, basically known from DE 42 03 372 C1, of a coupling of air spring and trailing link can be used with a minimum number of components and accordingly a minimised production expense, without the useable volume of the air spring being restricted or components such as a centring cone to be attached to the support arm of the trailing link, or the like also being required.

BRIEF DESCRIPTION OF THE DRAWINGS

In the following, the invention will be described in more detail with reference to drawings representing embodiments. In the schematic drawings:

FIG. 4*a*-4*c* are views of the working steps successively completed during the production of the axle assembly shown in FIGS. 1 to 3;

FIG. 6 is a vertically longitudinally sectional view of a detail of the axle assembly;

FIG. 7 is a horizontally longitudinally sectional view of a trailing link used in an axle assembly;

DETAILED DESCRIPTION OF THE PREFERRED EMBODIMENTS

Figure 1:
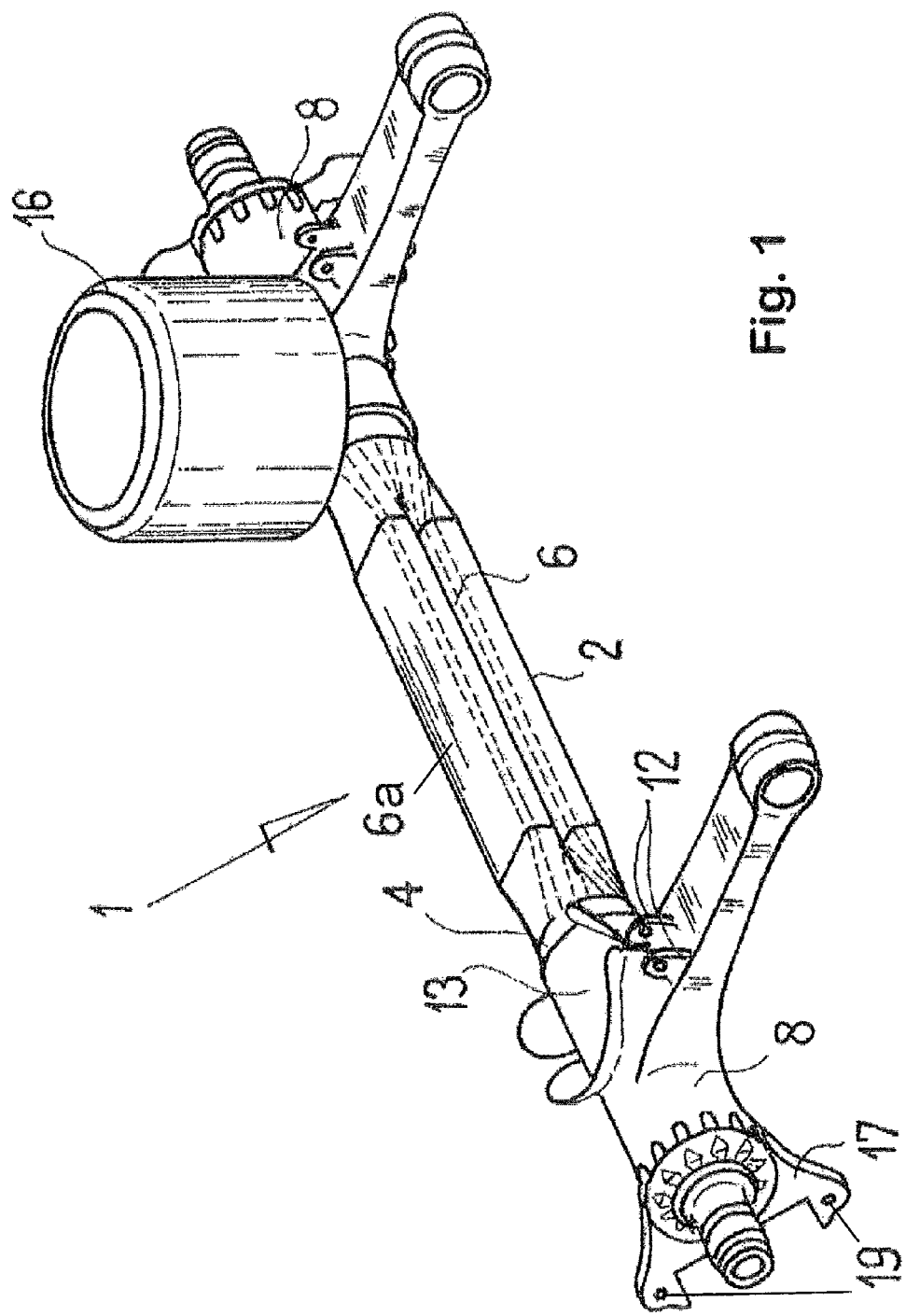
FIG. 1 is a perspective view of an axle assembly.
Figure 2:
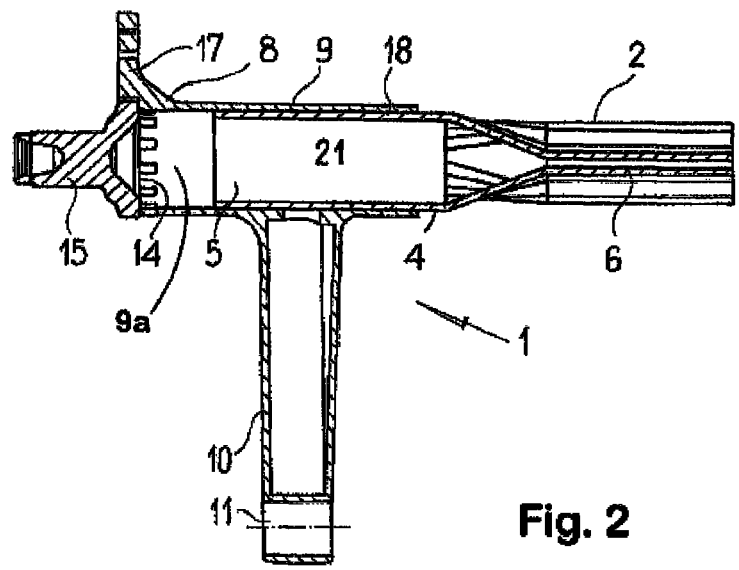
FIG. 2 is a horizontally longitudinal sectional view of a detail of the axle assembly.
Figure 3:
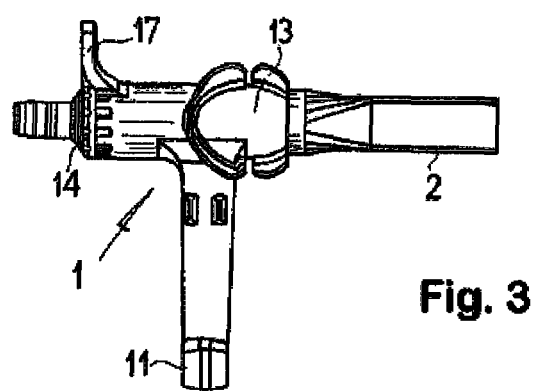
FIG. 3 is an uncut plan view of the detail according to FIG. 2.

The axle assembly 1 shown in FIGS. 1 to 3 and the axle assembly 101 shown in FIGS. 5 to 8*d* are in each case part of a non-driven axle of a trailer (not shown here) for an articulated lorry (not shown).

The axle assembly 1 comprises an axle 2 which is configured as an axle profile element which can be tubular. A respective trailing link 8 is fitted at the ends of the axle 2.

The axle 2 is produced from a hollow sheet steel profile and terminates in two end-face coupling portions 4, one of which is shown in FIG. 2. The end-face coupling portions 4 have the shape of a hollow profile 5 which is open towards its free end.

The axle 2 extending from one side of the vehicle to the other is approximately square in cross-section in its central region, differing from the coupling portion 4 and is provided with pressed-in groove deformations 6, thereby forming a torsional portion 6*a* in which the respective torsional section modulus is less than in the coupling portions 4 of the axle 2. This shaping of the axle 2 accordingly allows a torsion suspension, based on the torsion of the axle 2, of the elements connected at the ends.

The axle 2 supports on its cylindrical end-side coupling portion 4 a respective trailing link 8, one of which is shown in FIGS. 2 and 3. It can be seen in the sectional view according to FIG. 2 that the trailing link 8 comprises a connecting portion 9 which is configured like a sleeve, surrounds a seat 9*a* and has a control arm 10 attached thereto which projects in the radial direction.

The trailing link 8 with its moulded parts which have already been described and moulded parts which are still to be described is produced as an integral cast part in the ductile iron process, GJS 600 preferably being used as the cast material. Other types of steel or cast iron can also be used in the region of the join.

The control arm 10 terminates at its free end in a sleeve 11 which is to be mounted in a rotationally movable manner with a transverse shaft in a bracket (not shown). Two holding means 12 provided with holes are used to hold a shock absorber (not shown). Furthermore, provided on the trailing link 8 is a supporting plate 13 used for supporting an air spring bellows 16. In addition, a brake anchor plate 17 is produced integrally with the cast part. The brake anchor plate 17 contains openings 19 for receiving the sliding elements of a sliding calliper disc brake system (not shown).

Connected to the trailing link 8 by a screw crown 14 is also a separately prefabricated axle journal 15 on which a wheel (not shown) can be mounted rotatably in a conventional manner by a bearing.

The connecting portion 9 has a seat with an inner surface 18 which forms a surface of a regular cylinder. The respectively associated end-side coupling portion 4 of the axle 2 is rotatably inserted in the seat 9a. For this purpose, a pressure controlled internal high pressure joining process was used as the joining process.

The three basic phases (starting state, joining process, end state) of the internal high pressure joining process are shown in FIGS. 4a-4c.

The internal diameter of the seat 9a of the trailing link 9 in the unformed state is slightly greater than the external diameter of the associated end coupling portion 4 of the axle 2. The difference F between the greater internal diameter of the seat 9a and the smaller external diameter of the coupling portion 4 is termed the "joint clearance". The coupling portion 4 can initially be of a different shape than a cylindrical surface, in which case it must be ensured that during widening, a cylindrical body is produced.

A specific portion 21 of the coupling portion 4 is shaped using a widening lance 20, as is known per se for internal high pressure joining. In this portion 21, the widening lance 20 is provided with two seals 22 which form a sealed-off region. A hydraulic fluid is pressed, under high pressure (1000 to 2000 bars) into the sealed-off region. In so doing, the respective coupling portion 4 of the axle 2 is deformed in the joining process (FIG. 4b) and presses against the inner periphery of the seat 9a of the connecting portion 9 which, in so doing, also deforms and widens.

In this respect, it is assumed that the material from which the connecting portion 9 of the trailing link 8 and the axle 2 are respectively produced have specific springback potentials. As soon as the hydraulic fluid is discharged, i.e. the pressure abates, the connecting portion 9 reduces its diameter due to the flexibility which it still has, since its expansion has remained below the limiting value given by the elastic limit $\sigma_E$. The connecting portion 9 presses against the material of the coupling portion 4 of the axle 2. In this respect, a slight reforming is produced from the maximum widening up to the remaining widening (FIGS. 4b-4c). The coupling portion 4 remains rigidly connected to the inside of the connecting portion 9 of the trailing link and forms a non-rotatable join. In addition, the inside of the seat 9a can be formed with contact-increasing structures or can be formed such that the inner surface 18 of the connecting portion forms a surface of a regular cylinder and has a recess into which material of the coupling portion 4 fits snugly locally after widening and ensures a tight-fit securing means against twisting.

In FIGS. 4a-4c, "mA" indicates the maximum widening, "$P_F$" indicates the fluid pressure and "bA" indicates the widening which remains after the above-described internal high pressure forming process.

Figure 5:
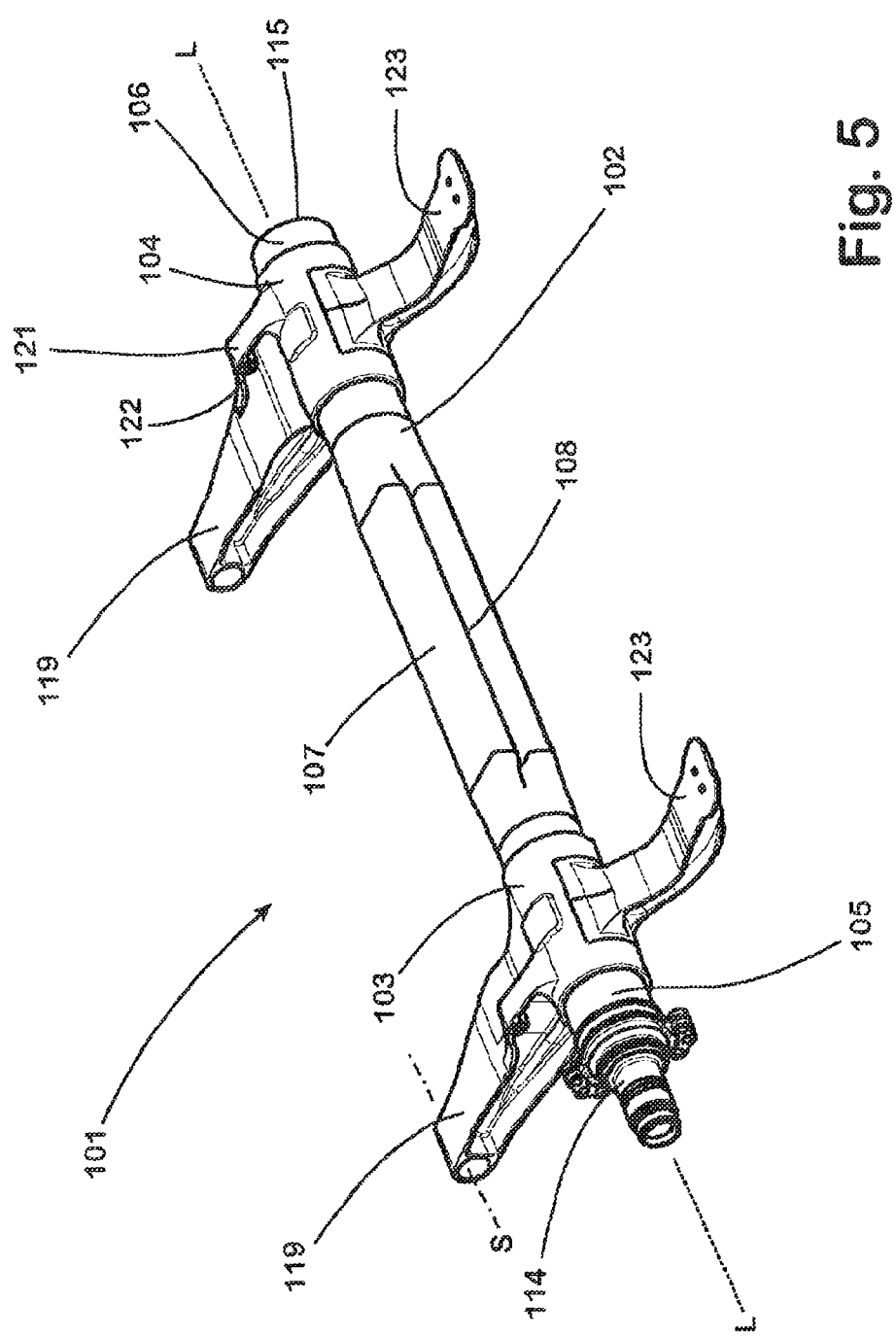
FIG. 5 is a perspective view of an axle assembly for a trailer of an articulated lorry.

FIGS. 5 to 7 show an alternative variant of an axle assembly 101 according to the invention. The axle assembly 101 also comprises an axle 102 and two trailing links 103, 104.

The axle 102 is produced from an originally cylindrical tubular steel profile, for example an S355 steel, with a wall thickness of 8 mm. It has a torsional portion 107 which is arranged centrally between its end portions 105, 106 and the length of which occupies approximately half the total length of the axle 102. To produce this torsional portion 107, the tubular profile was initially formed in a press (not shown here) such that it had a rectangular, approximately square cross section in the region of the torsional portion, while the end portions remained unchanged in cylindrical shape. A respective groove 108, 109 was then pressed into two opposing longitudinal walls of the torsional portion 107. The depth of the grooves 108, 109 was respectively selected such that the sheet portions forming the base of the grooves 108, 109 run closely next to one another axially parallel to the longitudinal axis L of the torsional portion 107. In this manner, the axle 102 has in its torsional portion 107 a lower torsional section modulus than its end portions 105, 106. The axle 102 can thus act in the manner of a torsion bar spring between the trailing links 103, 104.

Provided on the end portions 105, 106 of the axle 102 is a respective cylindrical coupling portion 110 by which the axle 2 sits in the seat 112 of the respectively associated trailing link 103, 104 such that the respective end portion 105, 106 laterally projects freely with its end face beyond the associated trailing link 103, 104. Welded to the end face of the end portions 105, 106 is a respective axle journal 114, 115 which has a journal 116 for mounting a wheel (not shown) and a brake anchor plate 117 to which a brake (not shown) can be attached.

The trailing links 103, 104 are produced mirror-symmetrically to one another as respectively integral cast parts from a ductile iron (cast iron with nodular graphite, GJS).

The steel material from which the axle 102 is produced and the cast iron material from which the trailing links 103, 104 are cast are coordinated with one another such that the modulus of elasticity $E_L$ of the cast material from which the trailing links 103, 104 are cast, is less than the modulus of elasticity $E_A$ of the steel from which the axle 102 is made with its respectively encompassed coupling portions 110, ($E_L<E_A$), alternatively or in addition, the breaking strength $Rm_L$ of the cast material of the trailing links 103, 104 is greater than the breaking strength $Rm_A$ of the steel of the axle 102 ($Rm_L>Rm_A$) and also alternatively or in addition the yield strength $R_{eS\_L}$ of the cast iron material of the trailing links 103, 104 is greater than the yield strength $R_{eS\_A}$ of the steel of the axle 102 ($R_{eS\_L}>R_{eS\_A}$).

Their respective seat 112 is moulded as a passage opening into a sleeve-like connecting portion 118 of the respective trailing link 103, 104 such that it is completely encompassed by material of the respective connecting portion 118.

In the unformed state, the coupling portions 110 of the axle 102 have an external diameter which is smaller than the internal diameter of the seat 112 associated therewith.

Connected to the connecting portion 118 of the trailing links 103, 104 is a respective control arm 119 which extends transversely to the longitudinal axis of the respective seat 112 and in the free end portion of which a bearing lug 120 is moulded. The bearing lug 120 pivotally mounts the trailing links 103, 104 in a mounting (not shown) on respectively one of the longitudinal chassis beams of the trailer (not shown) about a pivot axis S aligned axially parallel to the axle 102.

Configured in a transition region to the connecting portion 118 on the control arm 119 is also a bracket 121 in which a bearing lug 122 is moulded for the articulated connection of a shock absorber (not shown).

Formed integrally with the connecting portion 118 opposite the control arm 119 is a support arm 123 which is also aligned transversely to the longitudinal axis of the respective seat 112. On its free end, the support arm 123 has a bracket 124 for supporting a bellows (not shown) of a pneumatic suspension.

Moulded into the inner surface of the respective seat 112 of the trailing links 103, 104 is a respective oblong, groove-like recess 125 which is aligned axially parallel to the longitudinal axis of the seat 112. The recess 125 is aligned with respect to the control arm 119, the support arm 123 and the connecting portion 118 of the respective trailing link 103, 104 such that the neutral fibre of the bending stresses typically occurring in practice passes through them.

Figure 8A:
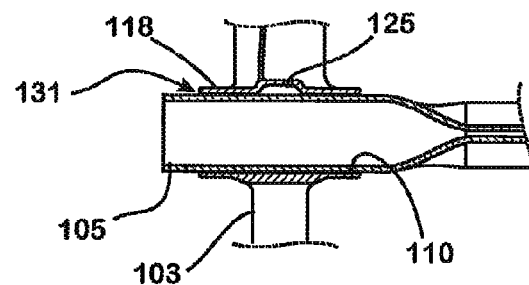
FIG. 8*a*-8*d* are sectional views of details corresponding to FIG. 5 of the axle assembly during various stages of its production.

To produce the axle assembly 101, first of all the end portion 105 is inserted into the seat 112 of the first trailing link 103 until its coupling portion 110 sits with clearance in the seat 112 (FIG. 8a).

Figure 8B:
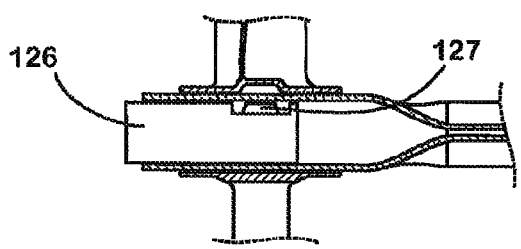

A forming tool 126 is then guided from its open end face into the space enclosed by the end portion 105. The forming tool 126 has a punch 127 which can be adjusted in the radial direction by a hydraulic drive and which is oriented opposite the recess 125 in the trailing link 103 when the forming tool 126 is in the working position (FIG. 8b).

Figure 8C:
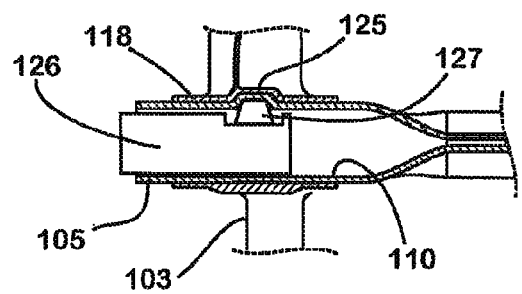

As soon as the forming tool 126 has been positioned, the punch 127 is moved with high pressure in the radial direction against the inner surface of the end portion 105. The steel material of the coupling portion 110 which is present in the region acted on by the punch flows into the recess 125 until said recess 125 is as far as possible completely full (FIG. 8c).

In this way, there is formed on the coupling portion 110 of the axle a projection 128 which is moulded positively into the correspondingly formed recess 125 in the connecting portion 118 of the trailing link 103. The positive connection, formed thus, between the axle 102 and the trailing link 103 serves as a safeguard if the non-positive connection, to be produced in the following, of these two components should not withstand the strains which occur in practice.

After the projection 128 has been produced, the forming tool 126 is removed from the end portion 105 and a device 129 for internal high pressure forming is introduced into the end portion 105. The device 129 has in a manner known per se a cylindrical housing provided with radially oriented outlets for a hydraulic fluid, around which housing a sleeve is positioned which consists of a flexible sealing material. When pressure is applied, the sleeve rests against the inner surface of the coupling portion 110 and thus ensures that the hydraulic fluid which is under high pressure does not escape into the surroundings. To prevent the sleeve from damage, the recess which may be present in the region of the projection 128 on the inner surface of the coupling portion 110 can be filled with an incompressible moulding material 130.

As a result of the charging with pressure carried out by the device 129, the coupling portion 110 is widened in the radial direction until its outer surface rests tightly against the inner surface of the seat 112. The clearance S existing between the inner surface of the seat 112 and the outer surface of the coupling portion 110 in the joined state (FIG. 8a) is calculated such that the stresses in the coupling portion 110 upon reaching the inner surface of the seat 112 are at least in the region of the yield strength $R_{eS}$ of the steel from which the axle 102 is made. Accordingly, the coupling portion 110 of the axle 102 is at least at the start of its plastic deformation.

With continued application of pressure, the connecting portion 118 of the trailing link 103 which completely encompasses the coupling portion 110 is also widened.

Figure 8D:
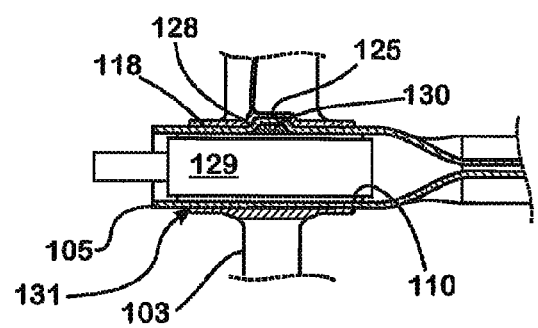

This procedure is continued until there are stresses in the connecting portion 118 after unloading, which stresses, although below the proof stress $R_{p0.2}$ of the cast material from which the trailing link 103 is cast, are however so high that the connecting portion 118 which is accordingly only elastically deformed exerts, after unloading, a pressing action on the plastically deformed coupling portion 110 which is sufficient in ensuring a permanently, twist-proof non-positive connection between the trailing link 103 and the axle 102 (FIG. 8d).

After the device 129 has also been removed from the end portion 105, the axle journal 114 can be welded onto the end face of the end portion 105.

The non-positive connection produced in the course of the widening procedure described above is calculated such that, when new, relative movements in the micrometer range between trailing link 103 and axle 102 can result. In the joining gap 131, these movements give rise to abraded particles and oxidation products which continue to accumulate in the joining gap 131 as service life continues. In this way, the non-positive connection between the trailing link 103 and the axle 102 continues to be strengthened.

The second trailing link 104 is then connected to the axle 102 in a corresponding manner.

The invention claimed is:

1. An axle assembly for a commercial vehicle, comprising an axle produced from a first metal material and at least one trailing link produced from a second metal material which has a connecting portion with a seat in which the axle sits with a hollow coupling portion such that the axle and the trailing link are in torque-proof engagement with one another, wherein at least one of the following conditions is met:

a) the modulus of elasticity $E_L$ of the metal material from which the connecting portion of the trailing link is made, is lower than the modulus of elasticity $E_A$ of the metal material of the coupling portion, encompassed thereby, of the axle;

b) the breaking strength Rm of the metal material of the connecting portion of the trailing link is greater than the breaking strength Rm of the metal material of the coupling portion of the axle;

c) the yield strength $R_{eS}$ or, if the metal material does not have a clearly defined yield strength, the proof stress $R_{p0.2}$ of the metal material, from which the connecting portion of the trailing link is made, is higher than the yield strength $R_{eS}$ or proof stress $R_{p0.2}$ of the metal material of the coupling portion, encompassed thereby, of the axle and the trailing link is under an elastic stress at least in the region of its connecting portion as the result of a forming operation, while the axle is deformed in a permanently plastic manner at least in the region of its coupling portion encompassed by the trailing link by a widening procedure, such that the trailing link and the axle are in torque-proof engagement with one another merely by a frictional connection, wherein the trailing link is connected positively to the coupling portion of the axle, in that a moulded element of the axle cooperates positively with a correspondingly formed moulded element of the trailing link, and wherein a non-positive connection between the trailing link and the coupling portion of the axle is calculated, when new, such that when the axle assembly is used, a relative movement in the micrometer range arises between the axle and the trailing link, as a result of which abraded particles form which are trapped in a joining gap and further impede relative movement.

2. The axle assembly according to claim 1, wherein the moulded element of the axle is a projection which projects outwards in the radial direction and is produced by cold-forming and the correspondingly formed moulded element of the trailing link is a recess into which the projection of the axle engages positively.

3. The axle assembly according to claim 2, wherein the recess is moulded into the inner peripheral surface of the connecting portion of the trailing link.

4. The axle assembly according to claim 1, wherein the axle is configured as an integral hollow profile.

5. The axle assembly according to claim 4, wherein the axle has a torsional portion which is more flexible in torsion compared to its coupling portion.

6. The axle assembly according to claim 5, wherein two trailing links are provided which each engage around one of the end portions of the axle, and in that the torsional portion is arranged between the end portions.

7. The axle assembly according to claim 1, wherein the trailing link is produced integrally.

8. The axle assembly according to claim 1, wherein the trailing link consists of a cast iron material.

* * * * *